United States Patent [19]

Miura et al.

[11] Patent Number: 4,671,237

[45] Date of Patent: Jun. 9, 1987

[54] IGNITION TIMING CONTROL SYSTEM FOR INTERNAL COMBUSTION ENGINES

[75] Inventors: Nabuo Miura, Wako; Norihisa Ishii, Sakado; Sumitaka Ogawa, Ohmiya, all of Japan

[73] Assignee: Honda Giken Kogyo Kabushiki Kaisha, Tokyo, Japan

[21] Appl. No.: 877,475

[22] Filed: Jun. 23, 1986

Related U.S. Application Data

[62] Division of Ser. No. 790,512, Oct. 23, 1985.

[30] Foreign Application Priority Data

Oct. 26, 1984 [JP] Japan ............................ 59-160978[U]
Nov. 14, 1984 [JP] Japan ................. 59-238292

[51] Int. Cl.$^4$ ............................................. F02P 5/145
[52] U.S. Cl. ...................................... 123/418; 123/427
[58] Field of Search ................ 123/415, 418, 427, 602

[56] References Cited

U.S. PATENT DOCUMENTS 4,292,943 10/1981 Kyogoku et al. ................... 123/418
4,473,050 9/1984 Kondo et al. ........................ 123/418
4,559,916 12/1985 Ookawa .............................. 123/418

Primary Examiner—Andrew M. Dolinar
Attorney, Agent, or Firm—Lyon & Lyon

[57] ABSTRACT

To obtain optimum combustion of fuel in an internal combustion engine and prevent the occurrence of reverse torque therein, an ignition timing control system having a pulse generating circuit for generating first and second timing pulses corresponding to respective predetermined crank angles of the engine includes means for producing all essential signals and, hence, for setting maximum delay angle ignition timing, based on a reference which is the leading edge of the second timing signal, which edge is unaffected by unstable engine rotation as when the engine is started. To simplify and reduce circuitry, an ignition signal generating circuit and a reverse torque preventing circuit are integrated and adapted to perform both functions.

1 Claim, 24 Drawing Figures

IGNITION TIMING CONTROL SYSTEM FOR INTERNAL COMBUSTION ENGINES

This is a division of application Ser. No. 790,512, filed Oct. 23, 1985.

BACKGROUND OF THE INVENTION

This invention relates to an ignition timing control system for internal combustion engines.

An ignition timing control system of an internal combustion engine in general is adapted to regulate the timing at which high-voltage pulses are supplied to the engine spark plugs in dependence upon a change in engine rpm in order to achieve optimum combustion of fuel in the engine cylinders, and to prevent the occurrence of a reverse torque when the engine runs in a region of very low rpm.

An ignition timing control control system for an internal combustion engine includes a pulser for generating first and second timing pulses, which are positive and negative, respectively, at predetermined crank angle positions close to top dead center of an engine cylinder when the engine rotates. For reasons that will be described in detail later, the maximum delay angle position of ignition timing at low engine speed corresponds to the trailing edge of the second timing pulse which is influenced by the rotational speed of the engine and becomes unstable particularly when the engine is rotating at very low speed, as when the engine is started. With the conventional ignition timing control system, therefore, the maximum delay angle position for ignition timing corresponds to the instant at which the second timing pulse decays and, hence, is influenced by the width of this pulse which, as mentioned above, is affected by engine speed, especially in the low-speed region. As a result, ignition timing at the maximum delay angle can become unstable and it may be difficult to suppress the occurrence of reverse torque in the engine. This makes it necessary to increase the mechanical strength of the engine, which forms a cause of greater engine weight.

In another aspect of an internal combustion engine ignition system, a capacitative-discharge ignition unit (commonly referred to as a C.D.I unit) is often employed in place of a mechanical breaker contact to prevent failures and deterioration in the overall ignition system. The C.D.I. unit includes a generator (ACG) having a charging generator coil (hereafter referred to as an exciter coil) the output whereof charges a capacitor in an ignition circuit, and an ignition signal-forming coil (hereafter referred to as a pulser coil, which is wound on the above-mentioned pulser) for producing an ignition signal applied to an ignition signal generating circuit. The ignition signal generating circuit produces an ignition signal at a predetermined timing dependent upon the rotational speed of the engine, and the ignition signal turns on a thyristor (SCR) connected to the abovementioned capacitor to discharge the same. This causes a large current to flow into the primary coil of an ignition coil connected to the capacitor, thereby producing a high voltage in the secondary coil of the ignition coil. The high voltage causes a spark plug to produce a spark. Ignition timing in an arrangement of this type ordinarily is controlled by a phase difference between the aforementioned first (positive) and second (negative) timing pulse signals produced by the pulser coil.

A conventional ignition timing control system employing such a C.D.I. unit is designed to be free of the effects of power supply fluctuation, pulser gap variance and changes in temperature in order to achieve accurate ignition timing and prevent the occurrence of reverse torque. However, this is achieved at the expense of circuit simplicity, compactness and ease of assembly, since a large number of circuit elements are required. There is thus room for improvement.

SUMMARY OF THE INVENTION

It is therefore a first object of the invention to provide an ignition timing control system for an internal combustion engine, having a two-stage advance angle characteristic and in which ignition timing at low engine rpm near the beginning of engine starting is controlled in a precise manner to effectively suppress the occurrence of reverse torque, thereby enabling the weight of the engine to be reduced.

A second object of the invention is to provide an ignition timing control system for an internal combustion engine, which is composed of simple circuitry and capable of being made small in size, and which is low in cost and designed to consume little electric power while effectively preventing reverse torque.

According to the present invention, the first object is attained by providing an ignition timing control system for an internal combustion engine for applying a trigger signal to an ignition circuit which, in response to the trigger signal, applies a high-voltage pulse to an ignition coil for driving a spark plug, the system comprising: pulse generating means for generating first and second timing pulses corresponding to respective predetermined crank angle positions of the engine; a first sawtooth wave generating circuit responsive to the second timing pulse for generating a first sawtooth signal of a predetermined slope in synchronism with a leading edge of the second timing pulse; a second sawtooth wave generating circuit responsive to the first and second timing pulses for generating a second sawtooth signal which rises generally vertically at a leading edge of the first timing pulse, decays generally vertically at the leading edge of the second timing pulse, and rises between the leading edges of the first and second timing pulses at a slope greater than the predetermined slope of the first sawtooth signal; a third sawtooth wave generating circuit connected to the first and second sawtooth wave generating circuits for generating a third sawtooth signal which rises at the leading edge of the first timing pulse at a slope greater than the predetermined slope of the first sawtooth signal, and decays generally vertically at the leading edge of the second timing pulse; a rectangular wave generating circuit which compares the first and third sawtooth signals for producing a rectangular wave signal of a level higher than that of the second sawtooth signal from an instant at which signal levels of the first and third sawtooth signals coincide until the leading edge of the second timing pulse; a comparator circuit which compares the first sawtooth signal with one of the second sawtooth signal and rectangular wave signal for generating a drive signal when signal levels of the two compared signals coincide; and a trigger signal generating circuit which receives the drive signal from the comparator circuit for generating the trigger signal in response to the drive signal.

Thus, according to the first embodiment of the invention, the first sawtooth signal is generated in synchronism with the leading edge of the second timing pulse, and the other signals likewise are formed so as to decay at the leading edge of the second timing pulse. The result is a two-stage advance angle characteristic for coping with changes in engine speed. Also, maximum delay angle ignition timing can be set based on the leading edge of the second timing pulse, which edge is not influenced by unstable rotation as when the engine is started. This makes possible precise control of ignition timing in order to effectively suppress the generation of reverse torque, thus enabling a reduction in engine weight.

According to the present invention, the second object is attained by providing an ignition timing control system for an internal combustion engine, comprising: a pulse generating circuit for generating first and second pulse signals corresponding to respective predetermined crank angles of the engine; a rectangular wave generating circuit responsive to the first and second pulse signals from the pulse generating circuit for generating a rectangular wave signal which rises at a predetermined slope from an instant of generation of the first pulse signal, and which decays at a slope less than the predetermined slope from an instant of generation of the second pulse signal; a decision circuit responsive to the rectangular wave signal from the rectangular wave generating circuit for producing an output of logic level "0" when a signal level of the rectangular wave signal is higher than a predetermined level, and an output of logic level "1" when the signal level is lower than the predetermined level; a triangular wave generating circuit connected to the decision circuit for generating a triangular signal which rises at a constant and gentle slope from an instant the decision circuit produces the output of logic level "1", decays at a slope defining a predetermined angle from an instant the first pulse signal is generated, and which then decays generally vertically to a logic level of "0" at an instant the second pulse signal is generated; and an ignition signal generating circuit connected to the decision circuit and to the triangular wave generating circuit for generating an ignition signal commanding an igniting action when the decision circuit and triangular wave generating circuit both produce outputs of logic level "0".

Thus, according to the second embodiment of the invention, the ignition signal generating circuit is adapted to generate the ignition signal in response to a combination of binary signals from the decision circuit and triangular wave generating circuit. It is therefore possible to construct these circuits using logic circuitry. This enables a general-purpose IC to be used to increase mounting density, thereby reducing the size and weight and lowering the cost. Further, since such circuitry as the decision circuit may be constructed using a C-MOS generalpurpose logic IC, power consumption can be reduced and the power generated by the exciter coil can be used efficiently as the spark plug ignition power.

Other features and advantages of the present invention will be apparent from the following description taken in conjunction with the accompanying drawings, in which like reference characters designate the same or similar parts throughout the figures thereof.

DETAILED DESCRIPTION

Before turning to a detailed description of embodiments of the present invention, the problems encountered in the prior art will be discussed in greater detail with reference to FIGS. 1 through 10.

Figure 1:
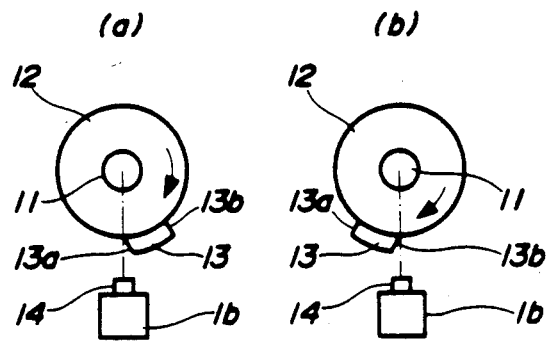
FIG. 1a and 1b are schematic views illustrating the relationship between crank angle position and a pulser coil in an internal combustion engine.
Figure 2:
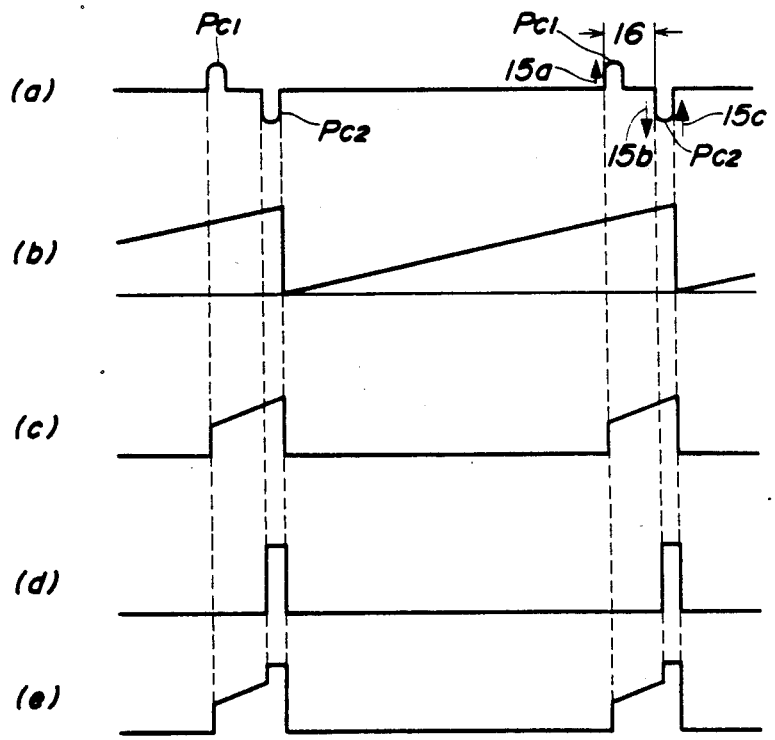
FIG. 2 is a timing chart illustrating the operation of an ignition timing control system according to the prior art.

FIGS. 1 and 2 are useful in describing an internal combustion engine ignition timing control system previously proposed by the assignee of the present application and disclosed in the specification of Japanese Provisional Patent Publication (Kokai) No. 60-26174, published Feb. 9, 1985. FIG. 1 illustrates pulse generating means, hereinafter referred to as a pulser, for generating first (positive) and second (negative) timing pulses Pc1, Pc2, respectively, at predetermined crank angle positions close to top dead center of an engine cylinder (hereinafter referred to as "TDC") when the engine rotates in the forward direction. The pulser includes a flywheel 12 mounted on an engine crankshaft 11, an inductor 13 made of a ferromagnetic material such as iron and fixedly secured to the flywheel 12, a magnet 14 so arranged that the inductor 13 will come into direct opposition therewith as the flywheel 12 rotates, and a pulser coil 1b wound on the magnet 14. The first timing pulse Pc1 rises, as shown by the arrow 15a in (a) of FIG. 2, at an angular position where one end 13a of the inductor 13 begins to pass by the magnet 14 with rotation of the crankshaft 11. The second timing pulse Pc2 rises, as shown by the arrow 15b in (a) of FIG. 2, at an angular position where the other end 13b of the inductor 13 departs from the magnet 14. The first and second timing pulses Pc1, Pc2 are thus generated at predetermined crank angle positions as the engine rotates. An interval 16 between the instants at which the first and second timing pulses Pc1, Pc2 rise is constant so long as the engine rpm remains the same. Control circuitry in the aforementioned patent application includes a first sawtooth generating circuit for generating a first sawtooth signal [(b) of FIG. 2] in synchronism with the trailing edge [arrow 15c in (a) of FIG. 2] of the second timing pulse Pc2, a second sawtooth generating circuit for generating a second sawtooth signal [(c) of FIG. 2] which rises generally vertically at the leading edge of the first pulse Pc1, and then gradually at a slope greater than that of the first sawtooth signal, and which then decays generally vertically at the trailing edge of the second pulse Pc2, a rectangular wave generating circuit for generating a rectangular wave signal [(d) of FIG. 2] of a level higher than that of the second sawtooth signal during the occurrence of the second timing pulse Pc2, a comparator circuit which compares the first sawtooth signal with the second sawtooth signal or with the rectangular wave signal for producing an ON signal when the levels of the two compared signals agree, and a trigger signal generating circuit for generating a trigger signal, which triggers an ignition circuit, in response to the ON signal.

In the foregoing ignition timing control system, the trailing edge of the second timing pulse Pc2 at 15c in (a) of FIG. 2 serves as a reference point on the basis of which the other signals are generated. Specifically, the first sawtooth signal is generated in synchronism with this reference point, and the other signals are generated in such a manner that their trailing edges are timed to the above reference point, as depicted in (c), (d) and (e) of FIG. 2. Since the trailing edges of these signals are timed to the trailing edge of the second timing pulse Pc2, the maximum delay angle position of ignition timing at low engine speed corresponds to the moment at which the second timing pulse Pc2 decays, i.e., to the trailing edge of the pulse Pc2. When the engine speed rises, the comparator circuit responds by producing the ON signal at a position correspondingly advanced in order to advance the ignition timing by a required amount.

Though the instants 15a, 15b at which the respective first and second timing pulses Pc1, Pc2 generated by the pulser rise are determined by, e.g., the distance between the ends 13a, 13b of the inductor 13, the pulse widths of these pulses Pc1, Pc2 are influenced by the rotational speed of the engine and tends to develop instability particularly at very low engine speeds that prevail when the engine is started.

Accordingly, with the foregoing ignition timing control system, the maximum delay angle position for ignition timing corresponds to the instant at which the second timing pulse Pc2 decays and, hence, is influenced by the width of this pulse. Consequently, there are occasions where ignition timing at the maximum delay angle becomes unstable, and difficulty is experienced in reliably suppressing the occurrence of reverse torque in the engine. This makes it necessary to increase the mechanical strength of the engine and results in greater engine weight.

The aformentioned is one of the problems the present invention seeks to solve in a first embodiment thereof. Another drawback encountered in the prior art will now be described in detail with reference to FIGS. 3 through 10.

A motorcycle engine generally is started by stepping down on a kick lever. If the stepping or kicking force applied by the rider is too weak, however, the compressive force internally of the cylinder is not overcome and the piston does not surmount TDC. Instead, the piston is forced back by this compressive force, as a result of which the engine rotates in the reverse direction.

This reverse rotation of the engine can result in an explosion in the reverse direction. Specifically, at low crankshaft rpm, the piston is forced back before TDC (hereinafter referred to as "BTDC") by the compression internally of the combustion chamber and ignition takes place when the crankshaft begins rotating in the reverse direction, thereby causing the explosion at reverse rotation. Alternatively, the piston may be forced back BTDC by the pressure of an explosion which occurs after normal ignition. In the case of the former, the first pulse signal Pc1 is produced [(b) of FIG. 4] when the inductor 13 passes the position of (b) of FIG. 3, and after the inductor 13 then passes the position of (c) of FIG. 3 and before it reaches the position of (d) of the figure, reverse rotation takes place, and the second pulse signal Pc2 is produced [(b) of FIG. 4] when the inductor 13 again passes the position of (b), whereupon ignition occurs. In the case of the latter, the second pulse signal Pc2 is produced [(c) of FIG. 4] to cause ignition when the inductor 13 passes the position of (d) of FIG. 2, and the piston is forced back by the pressure of an explosion before the inductor 13 reaches the position of (e) of FIG. 2. When the operation is normal, the first and second timing pulses Pc1, Pc2 occur at a time interval ta, as illustrated in (a) of FIG. 4. The pulse signal waveforms of (b) and (c) of FIG. 4 resulting from reverse rotation respectively involve time intervals tb, tc between the first and second timing pulses Pc1, Pc2 that are long in comparison with the time interval ta.

Figure 3:
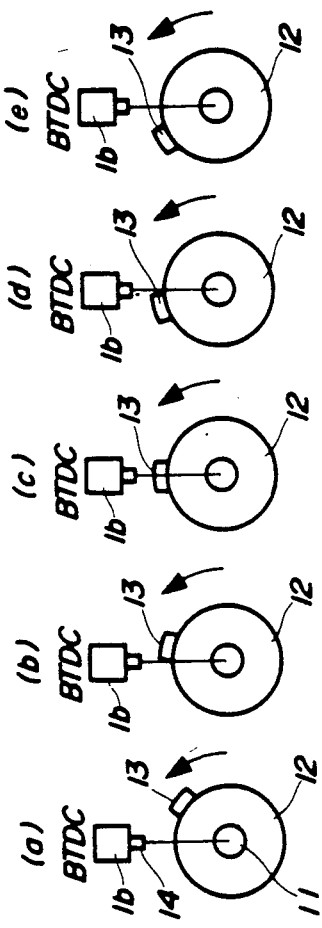
FIG. 3a–3e are schematic views illustrating the relationship between crank angle position and a pulser coil in an internal combustion engine.
Figure 4:
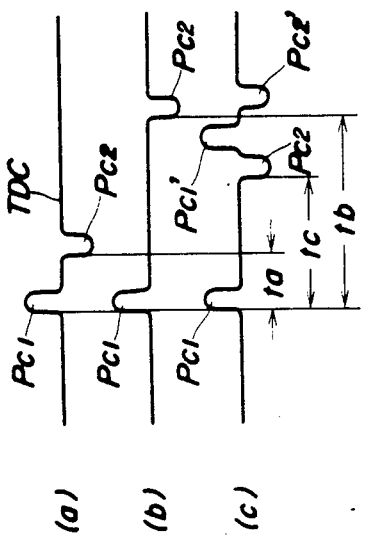
FIG. 4 is a timing chart illustrating output signals produced by the pulser coil.

When the piston is at a position near TDC as illustrated in FIG. 3 and the mixture inside the cylinder explodes, a large reverse torque is generated. The reverse torque acts in a direction opposite to that of the torque applied at the kick lever, and both torques act upon the gears and bearings arranged between the kick lever and crankshaft and subject the engine to excessive forces.

Figure 5:
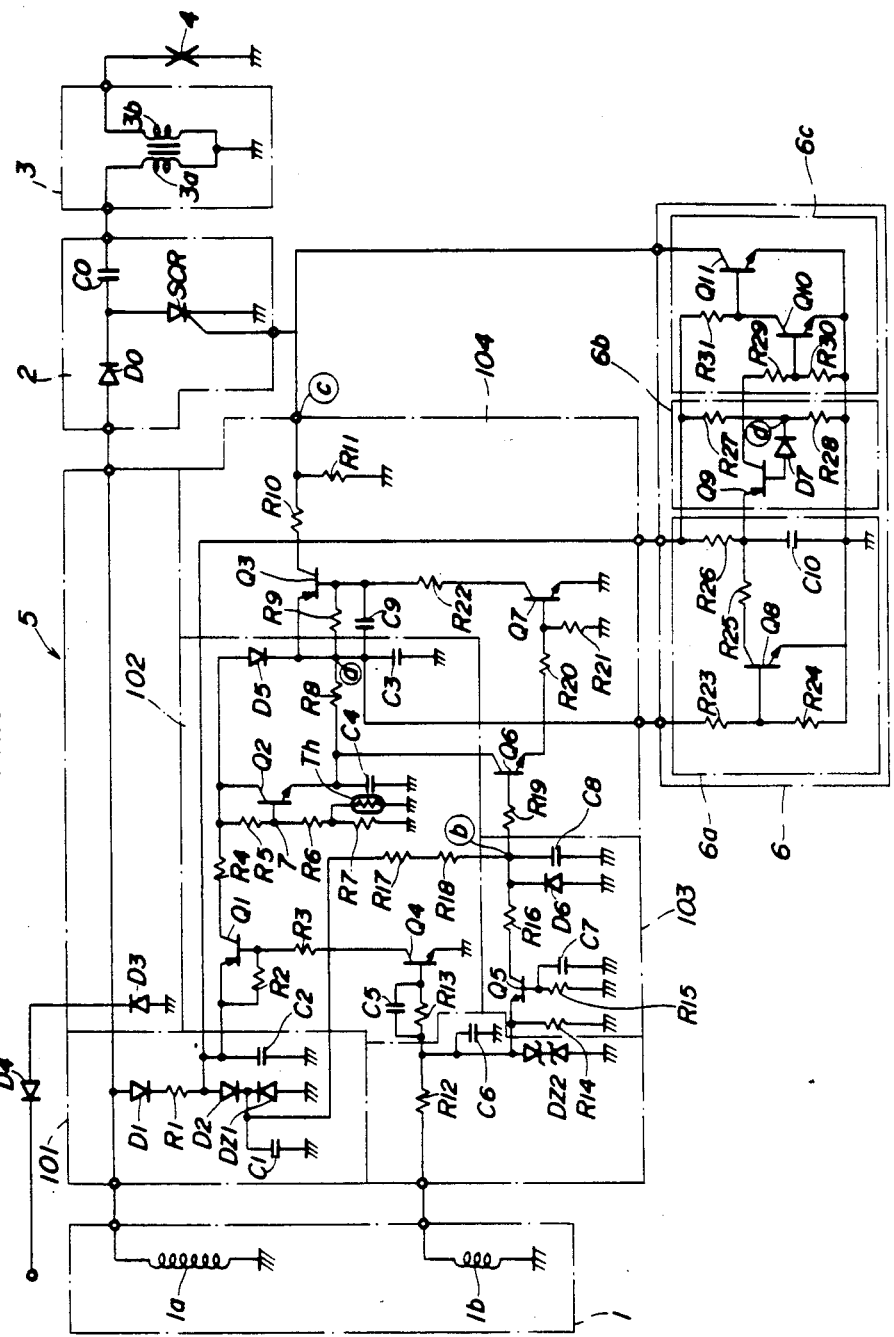
FIG. 5 is a circuit diagram illustrating an internal combustion engine ignition timing control system according to the prior art.

In an effort to eliminate the foregoing drawback, the applicant has proposed an internal combustion engine ignition timing control circuit disclosed in the specification of Japanese Patent Application No. 59-116662, not published yet. As illustrated in FIG. 5, the circuit includes a generator 1 having an exciter coil 1a and the aforementioned pulser coil 1b. The ungrounded end of the exciter coil 1a is connected to an ignition circuit 2 for producing high-voltage energy. The ignition circuit 2 includes a diode Do for rectifying the output of the exciter coil 1a, a capacitor Co charged by the rectified output of the diode Do, and a thyristor SCR connected to the junction of the diode Do and capacitor Co for controlling the discharge of the capacitor Co. The output side of the capacitor Co, which serves as the output terminal of the ignition circuit 2, is connected to a primary coil 3a which, in combination with a secondary coil 3b, forms an ignition coil 3. The ungrounded side of the secondary coil 3b is connected to a spark plug 4. An ignition signal generating circuit 5, which serves as an advance angle circuit, is arranged between the pulser coil 1b of the generator 1 and the thyristor SCR of ignition circuit 2. The ignition signal generation circuit 5 is provided with an ignition control circuit 6, which serves to prevent reverse torque.

Figure 6:
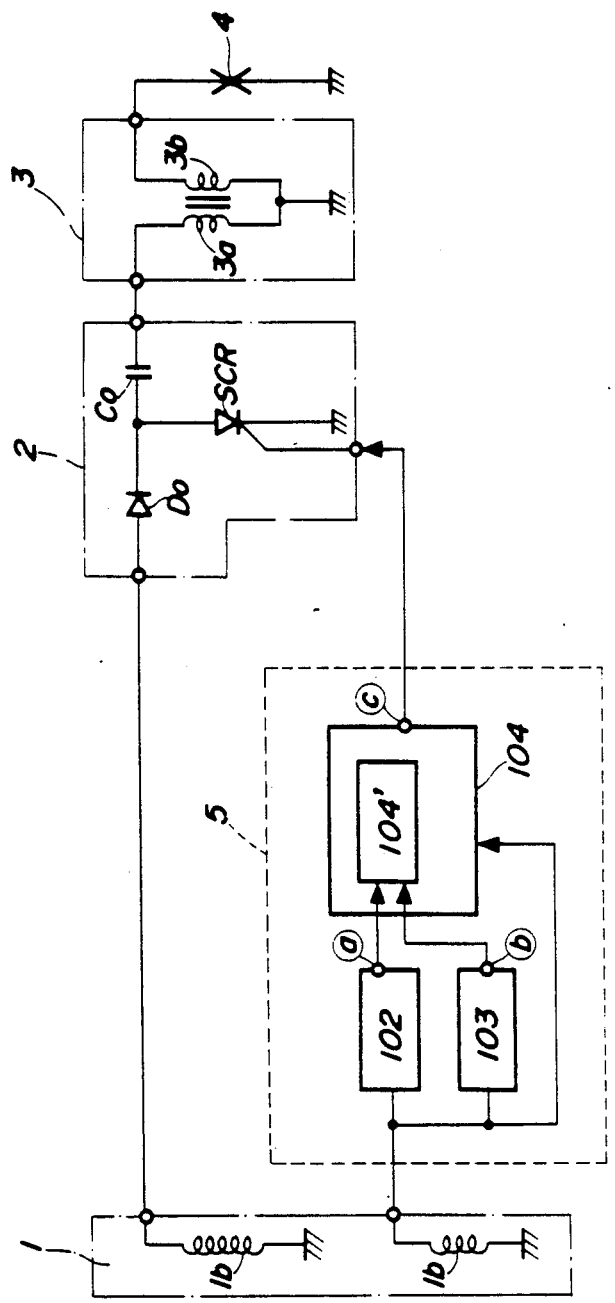
FIG. 6 is a block diagram illustrating an ignition signal generating circuit of the prior-art system of FIG. 5 in the form of functional blocks.
Figure 7:
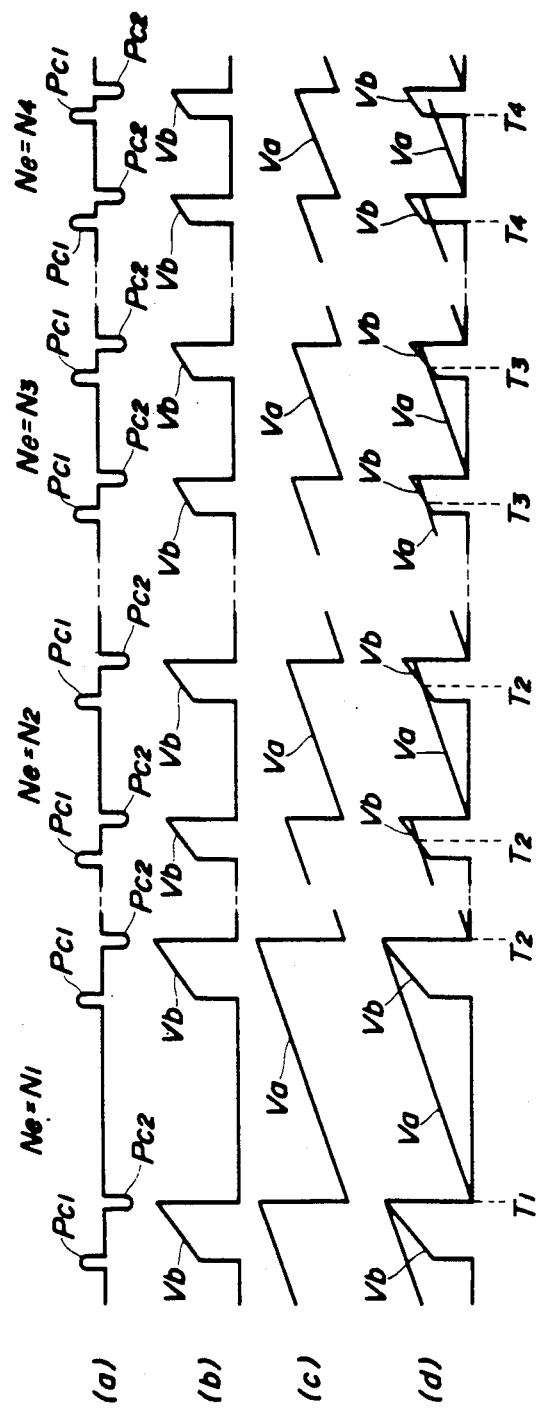
FIG. 7 is a timing chart illustrating the operation of the prior-art system of FIG. 5.

If considered in terms of function, the ignition signal generating circuit 5 comprises a number of circuit blocks, specifically a power supply circuit 101 and, as illustrated also in FIG. 6, a second sawtooth signal generating circuit 102 for converting the signal waveform from the pulser coil 1b into a second sawtooth signal signal Vb [(b) of FIG. 7] delivered at an output terminal a, a first sawtooth signal generating circuit 103 for converting the signal waveform from pulser coil 1b into a first sawtooth signal, signal Va [(b) of FIG. 7] delivered at an output terminal b, and a trigger signal generating circuit 104 having a comparator section 104' for comparing the voltage levels of the sawtooth signals Va, Vb, the circuit 104 generating a trigger signal at its output terminal c depending upon the output of the comparator section 104'.

The specific construction and operation of the circuit blocks 101 through 104 will now be described.

When the engine is started and the generator 1 begins rotating, the exciter coil 1a and pulser coil 1b each develop a voltage. The exciter coil 1a produces an output current which charges the capacitor Co in ignition circuit 2. Concurrently, capacitors C1, C2 in the power supply circuit 101 are charged to a voltage Ve regulated by a zener diode Dz1. The pulser coil 1b generates the first timing pulse Pc1, shown in (a) of FIG. 7, in response to which a transistor Q4 in the second sawtooth signal generating circuit 102 is driven into conduction, or turned on, thereby turning on a transistor Q1. As a result, a transistor Q2 is turned on so that a capacitor C4 is charged to the voltage at a potential dividing point 7 and a capacitor C3 is charged to a voltage approximately equivalent to Ve. Since the voltage Ve to which the capacitor C3 is charged is higher than that to which the capacitor C4 is charged, the latter is charged to the voltage Ve at a predetermined time constant decided by the capacitor C3 and a resistor R8. As will be described later, the capacitor C3 is discharged when the second timing pulse Pc2 is produced [(a) of FIG. 7] by the pulser coil 1b to turn on transistors Q5, Q6. Owing to this charging and discharging of the capacitor C3, the terminal voltage of capacitor C3, namely the second sawtooth signal Vb, takes on the form of the sawtooth voltage having the vertically rising leading edge, as shown in (b) of FIG. 7. When engine rpm Ne changes from N1 to N4 (where N1<N2<N3<N4), as shown in (a) of FIG. 7, the slope of second sawtooth signal Vb remains constant and only the peak value thereof changes, this becoming progressively smaller as engine rpm rises.

At the instant capacitor C3 is completely discharged by conduction of the transistor Q5, a capacitor C8 is charged at a time constant decided by resistors R17, R18. The maximum voltage developed by capacitor C8, namely the first sawtooth signal Va, is a sawtooth voltage which, at maximum, attains the voltage Ve, as shown in (c) of FIG. 7. The circuitry is so designed that the first sawtooth signal Va rises at a slower rate that the second sawtooth signal Vb. When engine rpm Ne rises from N1 to N4 (where N1<N2<N3<N4), as shown in FIG. 7, the slope of first sawtooth signal Va remains constant and only the peak value thereof changes, this becoming progressively smaller as engine rpm increases.

The trigger signal generating circuit 104 operates when the second timing pulse Pc2 from the pulser coil 1b is produced, or when the level of the second sawtooth signal Vb exceeds that of the first sawtooth signal Va. Reference is now made to ignition for the case where the second timing pulse Pc2 is produced. At the instant the pulse Pc2 arrives, the transistor Q5 is turned on and capacitor C8 begins discharging, whereupon the transistor Q6 is driven into conduction to discharge the capacitor C4 and, hence, the capacitor C3. Conduction of the transistor Q6 causes a transistor Q7 to turn on, and this in turn drives a transistor Q3 into conduction, thereby producing a trigger signal [(d) of FIG. 7] at a timing T1 to turn on the thyristor SCR. As a result, the charge in capacitor Co is discharged through the thyristor SCR to produce a large current flow (namely a discharge current) into the primary coil 3a of ignition coil 3. This in turn generates a high voltage in the secondary coil 3b to ignite the spark plug 4. The ignition timing at this instant is the maximum delay angle. As the engine rpm successively rises to N2, N3 and then N4, the ignition timing in each instance is the moment at which the level of the first sawtooth signal Va surpasses the level of the second sawtooth signal Vb, as shown in (d) of FIG. 7. When this occurs, the transistor Q6 is turned on and the trigger signal is produced, as described above. At the engine rpm of N2, the ignition signal is produced at a timing T2. At engine rpms of N3 and N4, the trigger signal is produced at timings T3, T4, respectively, as shown in (d) of FIG. 7 (d). Thus, ignition timing is advanced from the maximum delay angle each time by an angle of a prescribed magnitude. Note that the ignition timing in accordance with the engine rpm of N4 corresponds to the end of angle advance.

Figure 8:
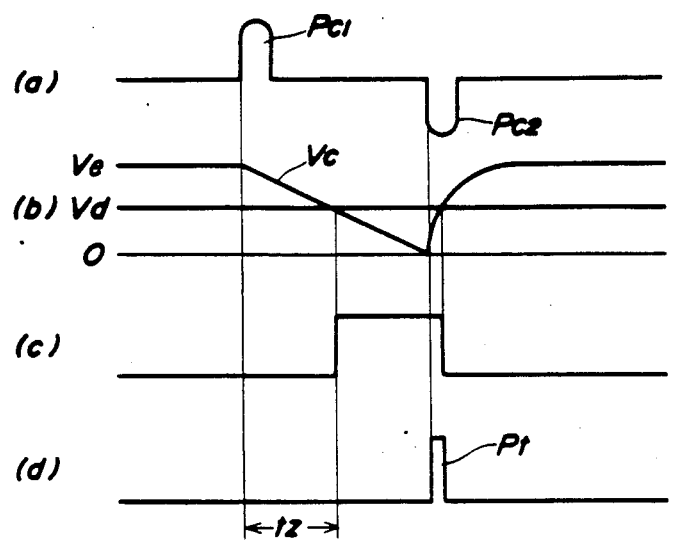
FIGS. 8, 9 and 10 are timing charts illustrating angle advance of ignition timing as performed by the prior-art system of FIG. 5.
Figure 9:
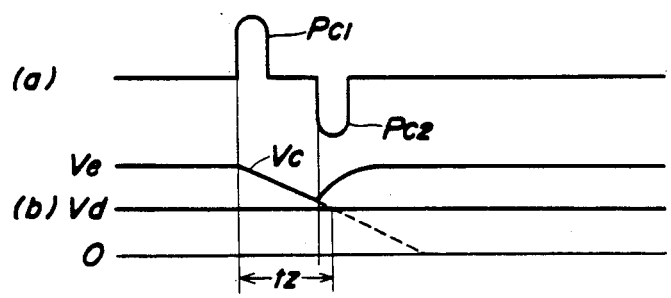
Figure 10:
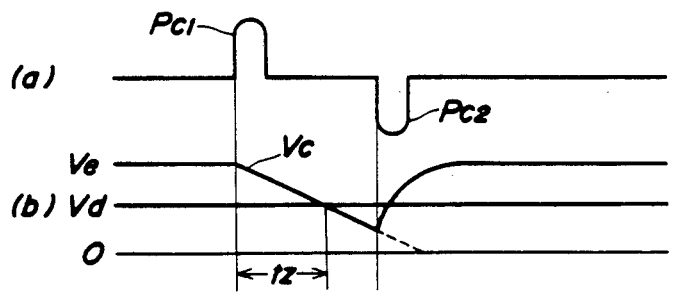
Figure 11:
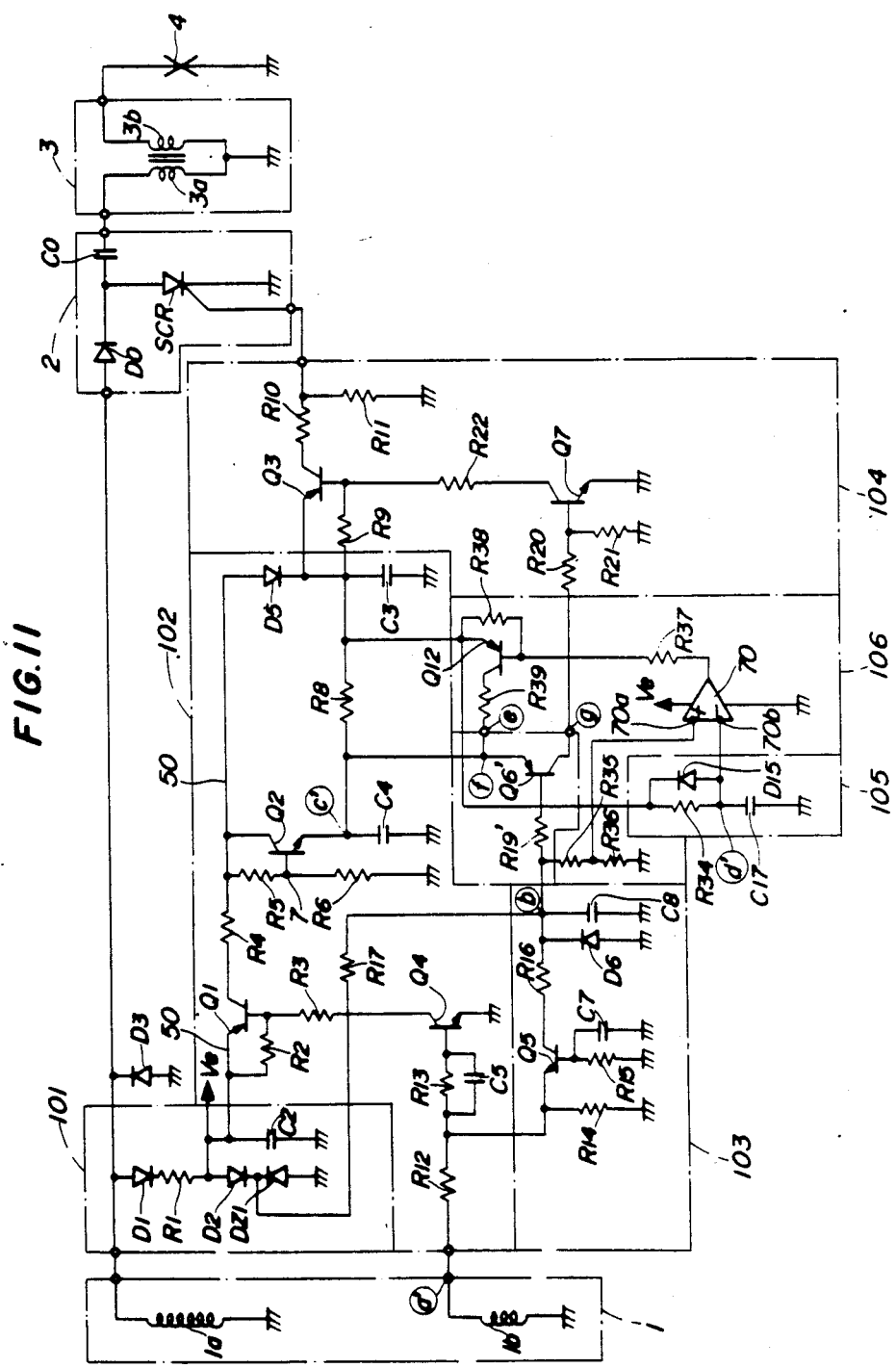
FIG. 11 is a circuit diagram illustrating a first embodiment of an internal combustion engine ignition timing control system according to the present invention.

The ignition control circuit 6, which acts to prevent the occurrence of reverse torque, will now be described with reference to FIGS. 8 through 10. The ignition control circuit 6 is composed of three circuit blocks, namely a Vc signal generator 6a, a comparator 6b and an ignition controller 6. The Vc signal generator 6a includes a capacitor C10 charged by the power supply circuit 101 to a terminal voltage approximately equal to the power supply voltage Ve. When the capacitor C3 is charged at the rise of the first timing pulse Pc1, a transistor Q8 is turned on and the capacitor C10 begins discharging through the transistor Q8 at a time constant decided by a resistor 25. When the transistors Q5, Q6 are turned on at the trailing edge of the second timing pulse Pc2 to discharge the capacitor C3 and cause its terminal voltage to drop, the transistor Q8 is cut off. As a result, the capacitor C10 stops discharging and simultaneously begins charging again at a time constant decided by a resistor R26. This produces the signal Vc having the waveform shown in (b) of FIG. 8. The comparator 6b compares the level of this signal with a voltage Vd at a potential dividing point d. When the condition Vc>Vd holds (which lasts for a fixed period of time serving as a reference time tz), a transistor Q9 in the comparator 6b conducts. A transistor Q10 in the ignition controller 6c is therefore turned on as long as the transistor Q9 remains conductive, as a result of which the collector voltage of transistor Q10 varies as shown in (c) of FIG. 8. A transistor Q11 in the ignition controller 6c has its base connected to the collector of transistor Q10 and is conductive as long as the transistor Q10 is cut off, during which time the gate terminal of the thyristor SCR is grounded. Accordingly, as shown in (a) and (b) of FIG. 9, when the second timing pulse Pc2 is applied before the lapse of the time period tz, which is measured from the instant at which the first timing pulse Pc1 rises, and an ignition pulse Pt is produced at the leading edge of the second timing pulse Pc2 [(d) of FIG. 9], the thyristor SCR is turned on and the spark plug 4 produces a spark. However, as shown in (a) and (b) of FIG. 10, the thyristor SCR cannot turn on and the spark plug 4 will not spark if the ignition pulse Pt is produced at the trailing edge of the second timing pulse Pc2 applied after passage of the time tz counting from the leading edge of the first timing pulse Pc1. Thus, a reverse torque is prevented from occurring.

Thus, the ignition timing control circuit for internal combustion engines according to the previously proposed application is advantageous in that it eliminates the influence of power supply fluctuation, pulser gap variance and temperature change to achieve accurate ignition timing and prevent the occurrence of reverse torque.

The drawback encountered in the above circuit is the large number of component parts required. For example, the second sawtooth signal generating circuit 102 in the ignition signal generating circuit 5 includes numerous discrete electrical parts such as three transistors, nine resistors, three capacitors, and one diode; the first sawtooth signal generating circuit 103 includes discrete parts such as one transistor, three resistors, two capacitors and one diode; and the ignition timing determination circuit 104 includes three transistors, seven resistors and one capacitor. Moreover, it is required to provide the ignition control circuit 6, which includes the Vc signal generator 6a, the comparator 6b and the ignition controller 6c. The large number of circuit elements necessitates considerable labor for assembly and places a limitation upon the size reduction that can be obtained. This is another problem addressed by the present invention in a second embodiment thereof.

The first embodiment of the present invention will now be described with reference to FIGS. 11 through 14.

The generator 1, ignition circuit 2, ignition coil 3 and spark plug 4 are constructed, interconnected and operate in the manner described above and need not be described again in detail. In the present embodiment, the ignition timing control circuitry arranged between the pulser coil 1b and ignition circuit 2 include the power supply circuit 101, the first sawtooth generating circuit 103 for generating the first sawtooth signal Va [(b) of FIG. 12] in synchronism with the leading edge of the second timing pulse Pc2, the second sawtooth generating circuit 102 for generating the second sawtooth signal Vb [(c) of FIG. 12] which rises rapidly or generally vertically at the leading edge of the first timing pulse Pc1, gradually at a slope greater than that of the first sawtooth signal, and which then decays rapidly or generally vertically at the leading edge of the second timing pulse Pc2, a third sawtooth signal generating circuit 105 for generating a third sawtooth signal Vc' [(d) of FIG. 12] which rises gradually at the leading edge of the first timing pulse Pc1 at a slope greater than that of the first sawtooth signal and then decays rapidly or generally vertically at the leading edge of the second timing pulse Pc2, a rectangular wave generating circuit 106 which compares the levels of the first and third sawtooth wave signals Va, Vc' for producing a rectangular wave signal Vd [(e) of FIG. 12] of a level higher than that of the second sawtooth signal Vb from the moment at which the sawtooth wave signals Va, Vc' coincide until the leading edge of the second timing pulse Pc2, a comparator circuit 107 for comparing the first sawtooth signal Va with a signal Vf [(f) of FIG. 12], which is the resultant of the second sawtooth signal Vb and the rectangular wave signal Vd, and for generating a drive signal when the levels of the signals Va, Vf agree, and the trigger signal generating circuit 104 for generating the trigger signal, which drives the ignition circuit 2, in response to the drive signal from the comparator circuit 107.

The power supply circuit 101 comprises a diode D1 for rectifying the AC voltage developed by the exciter coil 1a, the capacitor C2 charged by the rectified output through a resistor R1, a diode D2 and the zener diode Dz1. The diodes D2, Dz1 are for regulating the charging voltage to a voltage Ve of a predetermined level.

The first sawtooth generating circuit 103 includes the capacitor C8, which is connected to the power supply circuit 101 through the resistor R17, and the transistor Q5 whose base is connected to the ungrounded end of the capacitor C8 through a resistor R16. The transistor Q5 is turned on by the leading edge of the second (negative) timing pulse Pc2, upon which a discharge circuit is formed by resistors R14, R16 to discharge the voltage charged in the capacitor C8. The base of transistor Q5 is connected to ground through a parallel circuit composed of a bias setting resistor R15 and a capacitor C7. A diode D6 connected between ground and one end of resistor R16 is for waveshaping and other purposes.

The second sawtooth generating circuit 102 includes a power supply line 50 connected at one end to the power supply circuit 1 and at the other end to a capacitor C3 through a transistor Q1, a resistor R4 and a forwardly connected diode D5. The other end of the capacitor C3 is connected to ground. The base of transistor Q1 is connected to ground through a resistor R3 and a transistor Q4, and the base of transistor Q4 is connected to an output terminal a' of the pulser coil 1b through a parallel circuit composed of a resistor R13 and a capacitor C5, and a resistor R12. A series circuit comprising a transistor Q2 and a capacitor C4 is connected between the power supply line 50 and ground, with the collector of transistor Q2 connected to the collector of transistor Q1 through the resistor R4. Arranged in parallel with the transistor Q2 and the capacitor C4 is a voltage dividing circuit composed of two serially connected resistors R5, R6. The voltage dividing circuit has a voltage dividing point 7 connected to the base of transistor Q2. The junction c' between the transistor Q2 and the capacitor C4 is connected to the ungrounded side of the capacitor C3 through a resistor R8.

The third sawtooth wave generating circuit 106 includes a capacitor C17, one end of which is grounded, and the other end is connected via a resistor R34 to the ungrounded side of the capacitor C3 in the second sawtooth generating circuit 102. Connected in parallel with the resistor R34 is a diode D15 arranged forwardly from the side of capacitor C17 to the side of capacitor C3.

The rectangular wave generating circuit 106 includes a comparator 70 and a transistor Q12. The comparator 70 has a non-inverting input terminal 70a which receives the signal voltage of the first sawtooth signal Va set to an appropriate level by two resistors R35, R36, and an inverting input terminal 70b to which is connected an output terminal d' of the third sawtooth generating circuit 105. The comparator 70 also has an output terminal connected to the base of a transistor Q12 through a resistor R37. The emitter of transistor Q12 is connected to the ungrounded side of the capacitor C3 in the second sawtooth generating circuit 102, and the collector thereof is connected to an output terminal e through a resistor R39.

Figure 12:
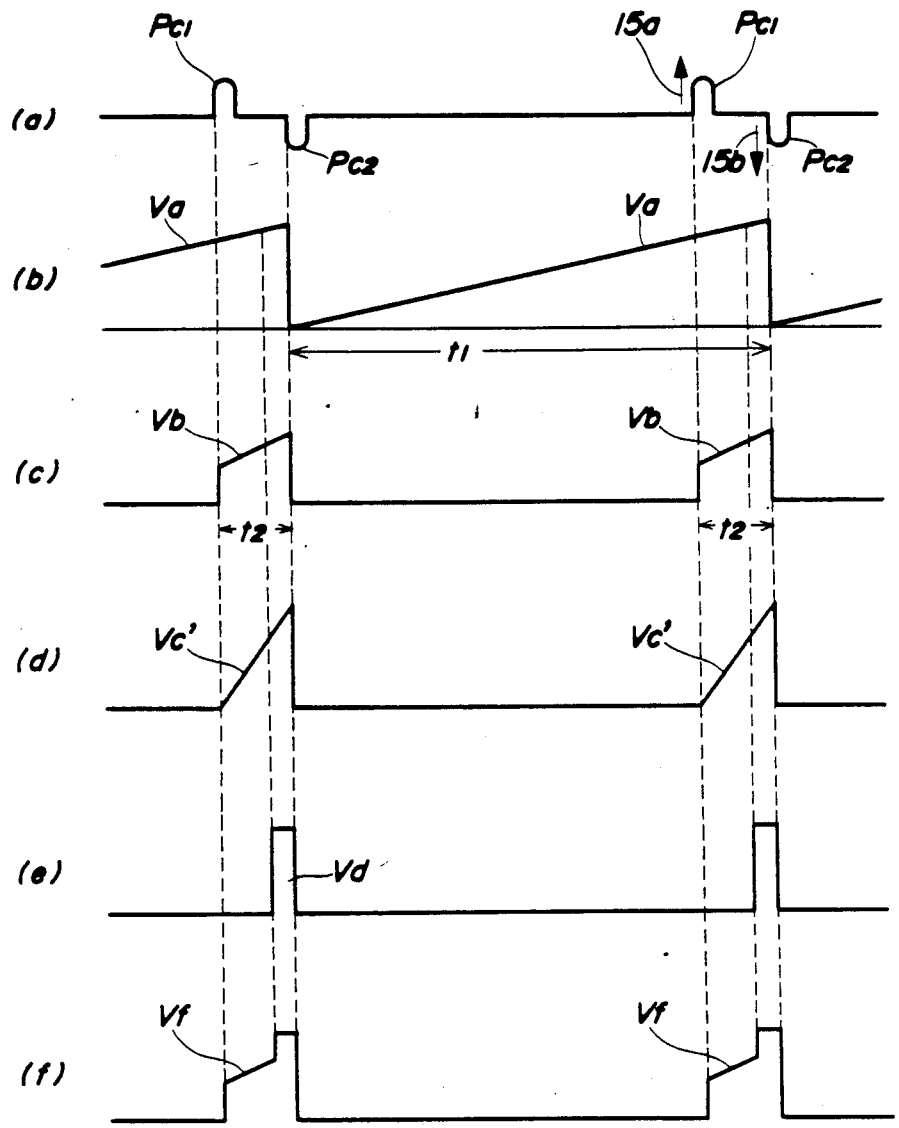
FIG. 12 is a timing chart illustrating the operation of the first embodiment of FIG. 11.

The comparator circuit 107 includes a transistor Q6' whose base is connected to the output terminal b of first sawtooth generating circuit 103 through a resistor 19', and whose emitter is connected to a common junction f between the output terminal c' of the second sawtooth generating circuit 102 and the output terminal e of the rectangular wave generating circuit 106, this junction serving as an output terminal for the resultant waveform shown in (f) of FIG. 12. The collector of transistor Q6' serves as an output terminal g for the drive signal produced as the result of the comparison operation.

The trigger signal generating circuit 104 includes the two transistors Q3, Q7. The power supply line 50 of the second sawtooth generating circuit 102 is connected to the emitter of transistor Q3 through the forwardly connected diode D5. The collector of transistor Q3 is connected to the gate of the thyristor SCR in the ignition circuit 2 through a potential dividing circuit composed of resistors R10, R11. The base of transistor Q3 is connected to ground via a resistor R22 and the transistor Q7. The base of the latter is connected to the output terminal g of comparator circuit 107 through a resistor R20. A resistor R21 connected between ground and the junction of resistor R20 and the base of transistor Q7 is for setting the biasing voltage of the transistor Q7.

The operation of the first embodiment will now be described with reference to FIGS. 11 through 14.

When the engine is started and the generator 1 begins rotating, the exciter coil 1a and pulser coil 1b each develop a voltage. The exciter coil 1a produces an AC output which is rectified by the diode Do of the ignition circuit 2 to charge the capacitor Co. Concurrently, the capacitor C2 of the power supply circuit 101 is charged under the regulation of zener diode Dz1 to the potential Ve.

Figure 13:
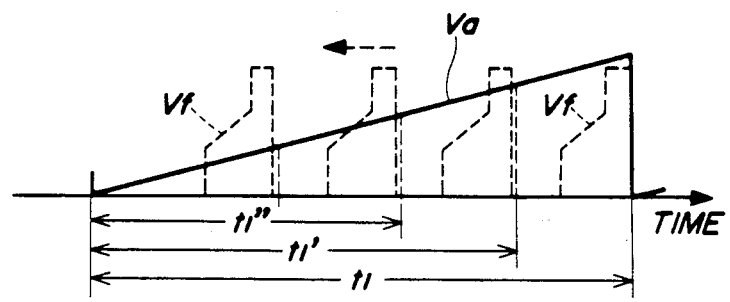
FIG. 13 is a timing chart illustrating angle advance of ignition timing as performed by the first embodiment of FIG. 11.
Figure 14:
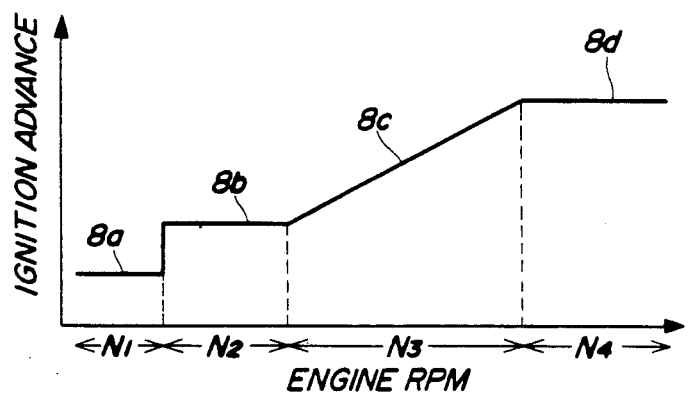
FIG. 14 is a graph illustrating an advance angle characteristic of ignition timing with respect to engine rpm in the first embodiment of FIG. 11.

The capacitor C8 in the first sawtooth generating circuit 103 is charged by the voltage Ve of power supply circuit 101 in accordance with a time constant decided by the capacitor C8 and resistor R17. Next, when the pulser coil 1b produces the second (negative) timing pulse Pc2, the transistor Q5 is turned on in synchronism with the leading edge of the second timing pulse Pc2 so that the voltage charged in capacitor C8 is discharged through a path comprising discharge resistor R16, transistor Q5 and resistor R14, whereby the first sawtooth waveform Va shown in (b) of FIG. 12 is generated at the output terminal b of the first sawtooth generating circuit 103. The slope of the first sawtooth signal Va, which is regulated at the time constant determined by resistor R17 and capacitor C8, is constant. The first sawtooth signal Va has a pulse duration t1 regulated by generation of the second timing pulse Pc2. Thus, the signal waveform of the first sawtooth signal is synchronized to the leading edge 15b of the second timing pulse Pc2. Therefore, as the engine speed rises from N1 to N4 (N1<N2<N3<N4), the period at which the second timing pulse Pc2 is generated grows correspondingly shorter, in response to which the pulse duration t1 of the first sawtooth signal Va shortens, as from t1 to t1' and t1' to t2', as illustrated in FIG. 13, so that the peak value of the first sawtooth signal Va gradually diminishes.

When the pulser coil 1b produces the first (positive) timing pulse Pc1, the transistors Q4, Q1 in the second sawtooth generating circuit 102 are turned on, as a result of which the capacitor C3 is charged to approximately the power supply voltage Ve. Conduction of transistor Q1 causes the transistor Q2 to turn on, so that the capacitor C4 is charged to the potential at the potential dividing point 7. Since the capacitor C3 is charged to a higher potential than the capacitor C4, the latter is charged by the charging voltage of capacitor C3 at a predetermined time constant decided by the resistor R8. As mentioned earlier, the voltage charged in capacitor C4 is discharged when the second pulse signal Pc2 is produced by the pulser coil 1b, thereby turning on transistors Q1, Q6'. Accordingly, the second sawtooth signal Vb having the rapidly or generally vertically rising leading edge shown in (c) of FIG. 12 is generated at the output terminal c' of the second sawtooth generating circuit 102. The slope of the second sawtooth signal Vb is set by a time constant decided by the resistor R8, etc. so as to be greater than the slope of the first sawtooth signal Va. The second sawtooth signal Vb has a pulse width t2 regulated by the interval (from 15a to 15b) between the leading edges of the first and second timing pulses Pc1, Pc2. As shown in FIG. 13, t2 grows successively smaller as engine rpm rises. Accordingly, the peak value of the second sawtooth signal Vb gradually diminishes with an increase in engine rpm.

At the instant the transistor Q1 is turned on, the capacitor C17 in the third sawtooth generating circuit 105 begins charging at a time constant regulated by the resistor R34 in combination with the capacitor C17. In a manner similar to that described above, the charging of capacitor C17 continues, due to the voltage accumulated in the capacitor C3, even after the transistor Q1 is cut off by extinguishment of the first timing pulse Pc1. The capacitor C17 is discharged when the transistors Q5, Q6' are turned on by the second timing pulse Pc2. Accordingly, the third sawtooth signal Vc' shown in (d) of FIG. 12 is generated at the output terminal d'.

The comparator 70 in the rectangular wave generating circuit 106 compares the signal level of the first sawtooth signal Va from the output terminal b and the signal level of the third sawtooth signal Vc' from the output terminal d', and produces an output of logical "0" when the signal level of Vc' surpasses that of Va. The "0" level output causes the transistor Q6' to conduct, thereby producing, at the output terminal e, a rectangular wave signal Vd the pulse width whereof corresponds to the period of time for which the transistor Q6' is conductive. Accordingly, a signal Vf shown in (f) of FIG. 12, which is the resultant of the second sawtooth signal Vb and rectangular wave signal Vd, is generated at the junction f at the common connection between output terminals c' and e.

The trigger signal generating circuit 104 sends a trigger signal to the ignition circuit 2 when the second timing pulse Pc2 from the pulser coil 1b is produced, or when the comparator 107 issues the drive signal in response to the signal level of the resultant signal Vf exceeding that of the first sawtooth signal Va. First, generation of the trigger signal where the second timing pulse Pc2 is produced will now be explained.

The transistor Q5 is turned on by the leading edge of the second timing pulse Pc2 and capacitor C8 begins discharging, whereupon the transistor Q6' is driven into conduction to discharge the capacitor C4 and, hence, the capacitor C3. Conduction of the transistor Q6' causes the transistors Q7, Q3 to turn on, thereby producing the trigger signal to turn on the thyristor SCR. As a result, the charge in capacitor Co is discharged through the thyristor SCR to produce a large discharge current flow into the primary coil 3a of ignition coil 3. This in turn causes generation of a high voltage in the secondary coil 3b to cause ignition of the spark plug 4. The ignition timing at this instant is the maximum delay angle, indicated at 8a in FIG. 14. The ignition timing of the maximum delay angle is thus regulated by the leading edge of the second timing pulse Pc2.

As the engine rpm successively rises from N2 at idling to N3 for advancing the injection timing and then to N4 at high engine speed, the ignition timing in each instance is the moment at which the signal level of the resultant signal Vf surpasses the level of the first sawtooth signal Va, these signal levels being compared by the comparator circuit 107. When this occurs, the comparator circuit 107 sends the drive signal to the transistor Q7, which is turned on. This is immediately followed by conduction of the transistor Q3, whereby the spark plug is caused to spark as set forth above. As shown in 8b in FIG. 14, the ignition timing at this instant is held at a value corresponding to a constant low crank angle position in the region of engine speed N2 (idling) due to the relationship between the signal waveform of the resultant signal Vf and the signal waveform of the first sawtooth signal Va. When the engine speed N3 is attained (i.e., at or above which the injection timing is to be advanced), the gradually rising portion of the resultant signal Vf crosses the first sawtooth signal Va, so that the ignition timing is gradually advanced as engine rpm rises, as illustrated at 8c in FIG. 14. When the region of high engine speed N4 is attained, the ignition timing is held at a value corresponding to a constant high crank angle position, as shown at 8d in FIG. 14. This provides a two-stage advance angle characteristic for the ignition timing.

According to the first embodiment of the present invention, the two-stage advance angle characteristic makes it possible to achieve optimum combustion in the engine cylinders in conformance with changes in engine speed. Moreover, maximum delay angle ignition timing can be set based on a reference which is the leading edge of the second timing pulse Pc2, this edge of the pulse being unaffected by unstable rotation of the engine as when the engine is started. Maximum delay angle ignition timing therefore can be controlled in a precise manner to effectively suppress the generation of reverse torque. Accordingly, the engine strength need not be raised to an unnecessary degree, thus enabling a reduction in the engine weight.

Reference is now made to FIGS. 15 through 19 to describe the second embodiment of the ignition timing control system according to the present invention, in which the ignition timing generating circuit (advance angle circuit) 5 and ignition control circuit (reverse torque prevention circuit) 6 appearing in FIG. 5 are included in integrated form to simplify the circuitry and reduce the hardware.

Figure 15:
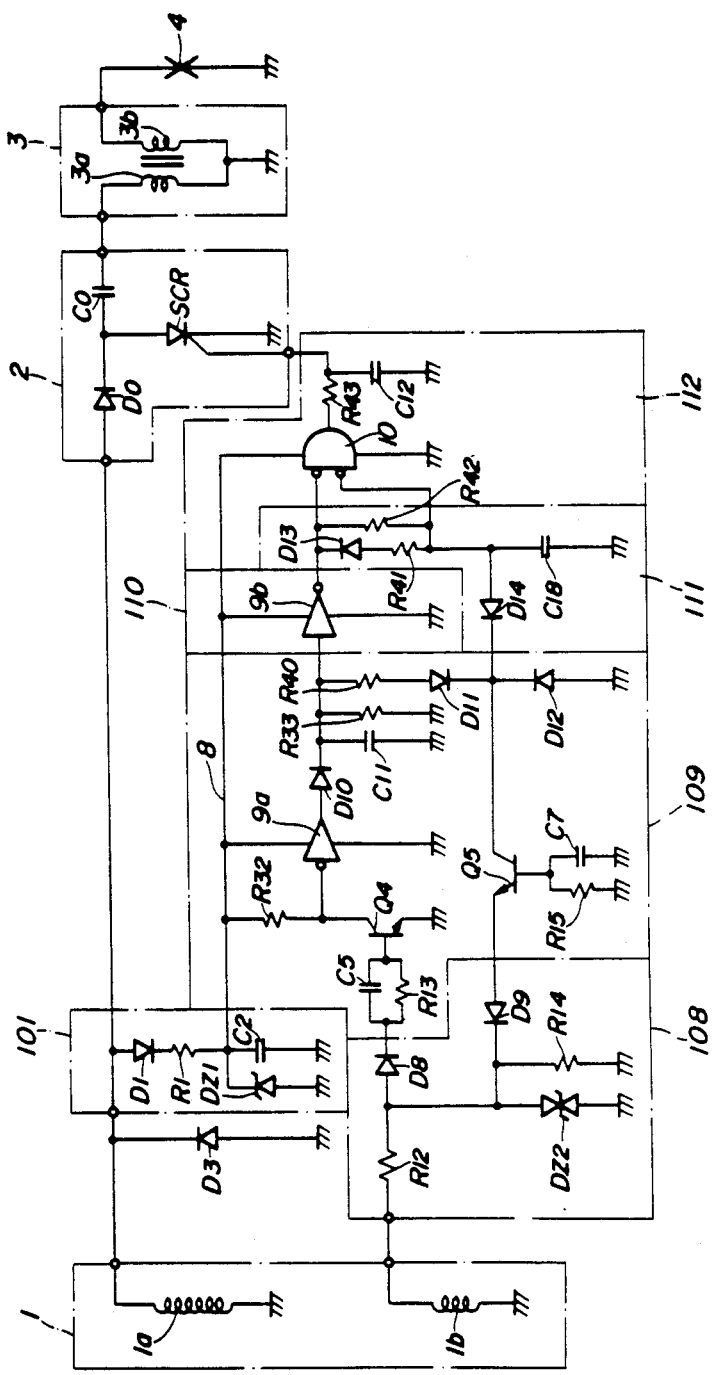
FIG. 15 is a circuit diagram illustrating a second embodiment of an internal combustion engine ignition timing control system according to the present invention.

As shown in FIG. 15, the ignition timing control system according to the second embodiment includes a power supply circuit 101, a pulse generating circuit 108 for generating first and second pulse signals each of which corresponds to a predetermined crank angle of the engine crankshaft, a rectangular wave generating circuit 109 for generating a rectangular wave which rises at a predetermined slope from an instant of generation of the first pulse signal, and which decays at a gentler slope from an instant of generation of the second pulse signal, a decision circuit 110 for producing an output of logic level "0" when the voltage level of the rectangular wave signal is higher than a predetermined level, a triangular wave generating circuit 111 for generating a triangular signal which rises at a constant, gentle slope from an instant the decision circuit 110 produces an output of logic level "1", decays at a predetermined angle from an instant the first pulse signal is generated, and which then reverts to the "0" level at the instant the second pulse signal is generated, and an ignition signal generating circuit 112 for generating an ignition signal upon receiving "0" level signals from the decision circuit 110 and triangular wave generating circuit 111.

The pulse generating circuit 108 includes diodes D8, D9 connected in mutually opposing directions to the pulser coil 1b through the resistor R12. A parallel circuit composed of the resistor R14 and a bidirectional zener diode Dz2 is connected between ground and the line interconnecting the diodes D8, D9. The diodes D8, D9 produce the first (positive) and second (negative) pulse signals, which are applied to the rectangular wave generating circuit 109. The diode Dz2 is for protecting the circuit from excessive pulse voltages produced by the pulser coil 1b.

The rectangular wave generating circuit 109 includes a first inverter 9a having an input terminal connected to the conjunction between a resistor R32 and a transistor Q4 constituting a series circuit arranged between a power supply line 8 and ground. The base of transistor Q4 is connected to a diode D8 of the pulse generating circuit 108 through a parallel circuit composed of a resistor 13 and a capacitor C5, which is for preventing noise. Forwardly connected to the output terminal of the inverter 9a is a diode D10. A capacitor C11 and a resistor R33 are connected in parallel between ground and the output line of diode D10, which line is connected to ground through a resistor R40, a forwardly connected diode D11, and a reversely connected diode D12. The junction between the diodes D11, D12 is connected to the diode D9 in the pulse generating circuit 108 through the transistor Q5.

The decision circuit 110 includes a second inverter 9b having an input terminal to which the output line of diode D10 in the rectangular wave generating circuit 109 is connected. The inverter 9b has an internal transistor switching element whose inversion threshold level Eth (approximately 0.7 V) is predetermined for operation of the inverter 9b.

The triangular wave generating circuit 111 includes a series circuit composed of a reversely connected diode D13, a resistor R41 and a capacitor C18 arranged between ground and the output line of the second inverter 9b. A resistor R42 is connected in parallel with the serially connected diode D13 and resistor R41. The ungrounded side of capacitor C18 is connected to the junction between diodes D11, D12 of the rectangular wave generating circuit 109 through a forwardly connected diode D14.

The ignition signal generating circuit 112 includes a NAND circuit 10. The NAND circuit 10 has two input terminals, one of which is connected to the output terminal of the second inverter 9b, the other of which is connected to the ungrounded side of the capacitor C18 in the triangular wave generating circuit 111. The output terminal of NAND circuit 10 is connected to the gate terminal of the thyristor SCR through a low-pass filter composed of a resistor R43 and a capacitor C12.

The operation of the second embodiment shown in FIG. 15 will now be described with reference to FIGS. 16 through 19.

When the engine is started and the generator 1 begins rotating, the exciter coil 1a and pulser coil 1b each develop a voltage. The exciter coil 1a produces an output current which charges the capacitor Co in the ignition circuit 2. Concurrently, the capacitor C2 in the power supply circuit 101 is charged to a voltage regulated by the zener diode Dz1. When the pulser coil 1b applies the first timing pulse Pc1 to the pulse generating circuit 108 [(a) of FIG. 16], the diode D8 applies the signal as the first pulse signal to the transistor Q4, in response to which the transistor Q4 is driven into conduction to change the input level of the first inverter 9a to ground potential, whereby the output terminal of inverter 9a goes to logical "1". Owing to this "1" level output, the capacitor C11 charges. The charged voltage thereafter discharges gradually through the resistor R33 [(b) of FIG. 16]. Next, when the pulser coil 1b applies the second timing pulse Pc2 to the pulse generating circuit 108 [(a) of FIG. 16], the diode D9 applies the signal as the second pulse signal to the transistor Q5 in the rectangular wave generating circuit 109, thereby turning the transistor Q5 on. In response thereto, the voltage charged in the capacitor C11 is discharged at a slope gentler than that which prevailed during the voltage rise [(b) of FIG. 16], this being regulated by a discharge time constant decided by such circuit elements as resistors R40 and R14. Accordingly, the rectangular wave generating circuit 109 generates the rectangular wave signal Vg indicated at (b) in FIG. 16.

Figure 16:
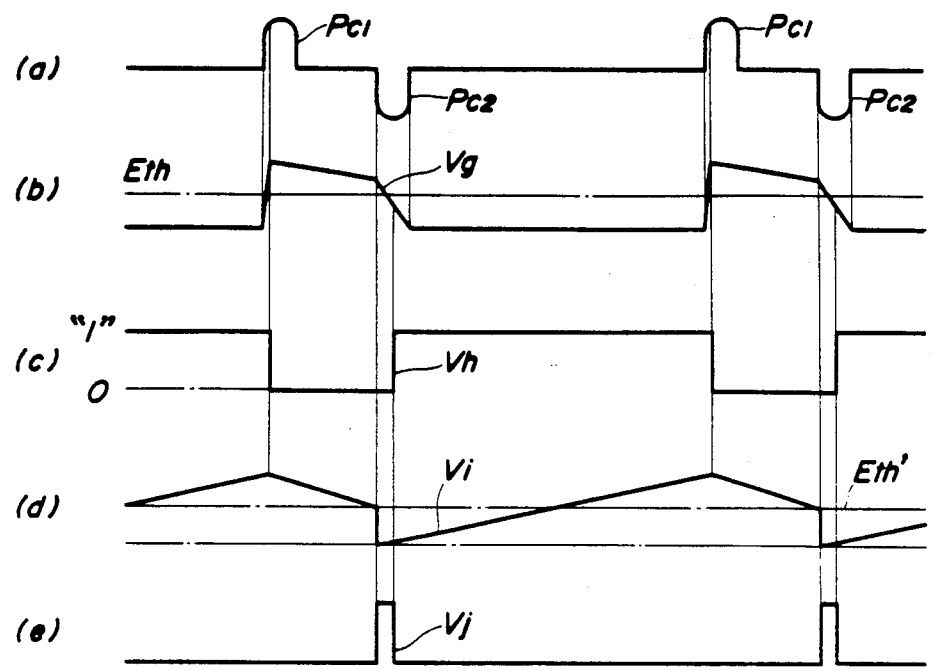
FIG. 16 is a timing chart illustrating the operation of the second embodiment of FIG. 15.
Figure 17:
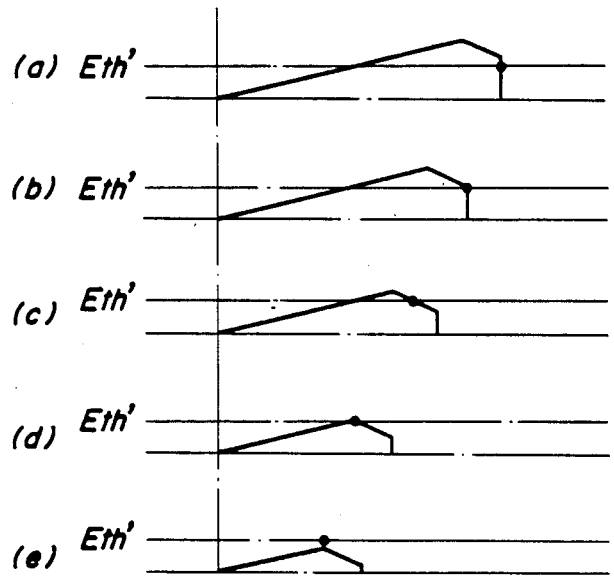
FIG. 17 is a timing chart illustrating angle advance of ignition timing as performed by the second embodiment of FIG. 15.

As mentioned above, the operating level of the second inverter 9b is set at a predetermined threshold value Eth. The decision circuit 110 produces the output signal Vh of logic level "0" during the time that the level of the rectangular wave signal Vg exceeds the predetermined threshold level Eth of the inverter 9b, and produces the output signal of logic level "1" during the time that the level of the rectangular wave signal Vg is below the predetermined threshold level, as a bilevel signal Vh shown in (c) of FIG. 16. When the rectangular wave signal Vg decays at a gentle slope in response to generation of the second timing pulse Pc2 and falls below the predetermined level Eth, the second inverter 9b produces the "1" level output as the bilevel signal Vh. The leading edge of this "1" level pulse therefore occurs at a timing slightly later than that at which the second timing pulse Pc2 is generated, as shown in FIG. 16. At the instant the output of the second inverter 9b rises from "0" to "1", the capacitor C18 in the triangular wave generator 111 begins charging at an gentle slope in accordance with a charging time constant decided by resistor R42 and the capacitance of capacitor C18 [(d) of FIG. 16]. Then, at the instant the output of second inverter 9b reverts to the "0" level (i.e., when the first timing pulse Pc1 is generated), the voltage charged in capacitor C18 decays, i.e., discharges, at a fixed slope in accordance with a discharge time constant decided by such circuitry as the parallel circuit composed of resistors R41 and R42 [(d) of FIG. 16]. When the second timing pulse Pc2 is generated during the decay of this voltage signal, transistor Q5 is turned on. At the moment this occurs, capacitor C18 discharges rapidly to the "0" level. Thus, a triangular wave signal Vi shown in (d) of FIG. 16 is applied to the ignition signal generating circuit 112 from the ungrounded side or point a of the capacitor C18 in the triangular wave generating circuit 111. As mentioned above, the timing at which the output Vh of second inverter 9b rises to the "1" level occurs slightly later than that at which the second timing pulse Pc2 is generated, and the potential or signal Vi at the ungrounded side of capacitor C18 reverts to the "0" level at the moment the second timing pulse Pc2 is generated. Therefore, the two input signals of level "0" to the NAND circuit 10 cause the circuit to produce "1" level output as an ignition signal Vj in synchronism with the generation of the second timing pulse Pc2, as the result of which the ignition signal generating circuit 112 delivers the ignition signal as shown in (e) of FIG. 16. This signal turns on the thyristor SCR so that the spark plug 4 is caused to spark by the ignition coil 3. Since the illustrated example is applied when the engine is in a low speed region, the ignition timing at this instant corresponds to the maximum delay angle.

Now will be explained angle advance of ignition timing with an increase in the engine speed, as well as the prevention of reverse torque.

As the engine speed rises, the time interval between generation of the first and second timing pulses Pc1, Pc2 shortens, and so does the charging time interval of the capacitor C18 in the triangular wave generating circuit 111. As a result, the pulse width of the triangular wave signal Vi gradually diminishes, as indicated at (a) through (e) in FIG. 17. Since the charging time is long at low engine speed, the signal level of the triangular wave signal Vi is sufficiently higher than the operating or threshold level Eth' of the NAND circuit 10. Therefore, the instant at which the triangular wave signal Vi decays sharply responsive to the generation of the second timing pulse Pc2 corresponds to the timing at which the thyristor SCR is turned on [(a) and (b) in FIG. 17)]. As the peak level of the triangular wave signal Vi falls owing to the shorter charging time interval of capacitor C18 caused by a rise in engine rpm, the intersection between the triangular wave signal and the operating level Eth' of NAND gate 10 is gradually shifted leftward as shown in (a) through (e) of FIG. 17, so that the ignition timing has its angle advanced in accordance with this leftward shift of the intersection point from (a) to (e) in FIG. 17 on the condition that the rectangular wave signal in the rectangular wave generating circuit 109 exceeds the threshold level Eth of the second inverter 9b. When engine rpm rises still higher so that the peak level of the triangular wave signal Vi drops below the operating level Eth' of the NAND circuit 10, as shown in (e) of FIG. 17, one input terminal to the NAND circuit 10 goes to the "0" level and stays there. Accordingly, the point at which the output Vh [(c) of FIG. 16] of the second inverter 9b decays corresponds to the timing at which the thyristor SCR is turned on. The ignition timing at this instant is the maximum advance angle.

Figure 18:
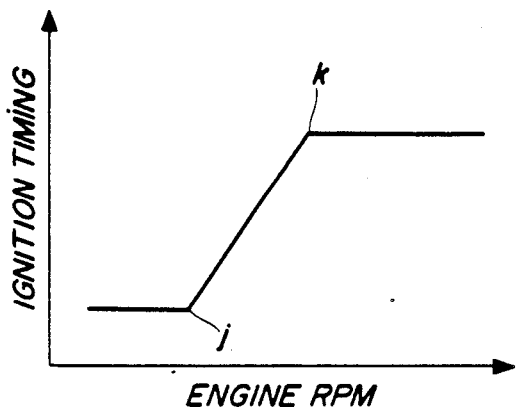
FIG. 18 is a graph illustrating an advance angle characteristic of ignition timing with respect to engine rpm in the second embodiment of FIG. 15.
Figure 19:
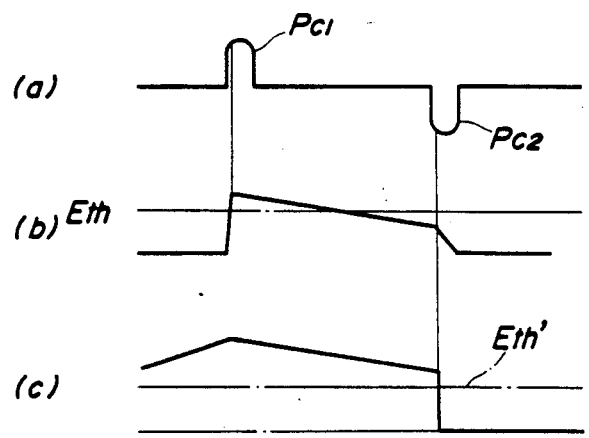
FIG. 19 is a timing chart useful in describing the prevention of reverse torque according to the second embodiment of FIG. 15.

FIG. 18 is a characteristic illustrating angle advance of ignition timing as performed above. This shows that, as engine rpm rises, the ignition timing is gradually advanced from the beginning j [corresponding to (b) in FIG. 17] of the advance operation and becomes constant at the maximum advance angle following the end k [corresponding to (d) in FIG. 17] of the advance operation.

As for prevention of reverse torque, the rectangular wave signal Vg shown in (b) of FIG. 16 always decays gently owing to the discharge through the resistor R33 when the engine speed is very low. The rectangular wave signal Vg therefore drops below the threshold level Eth of the second inverter 9b before the second timing pulse PC2 is generated, as shown in (a) and (b) of FIG. 19. Accordingly, at the instant the second timing pulse Pc2 is generated, the output Vh of second inverter 9b will always be at the "1" level, so that the thyristor SCR cannot be turned on. This prevents ignition, which forms a cause of reverse torque when the rider steps down on the kick lever.

According to the second embodiment of the present invention, the decision circuit 110 and ignition signal generating circuit 112 operate on the basis of the binary signals "0" and "1", enabling the application of logic circuitry. Accordingly, a general-purpose IC can be used to heighten the mounting density, thereby reducing the size and weight and lowering the manufacturing cost. Furthermore, the ignition control circuit for preventing reverse torque need not be provided separately of the ignition signal generating circuit 112 for angle advance. Instead, the two circuits are integrated into a single circuit for implementing both angle advance and the prevention of reverse torque. This makes it possible to achieve an even greater reduction in size, weight and cost. In addition, since such circuitry as the decision circuit 110 is capable of employing a C-MOS general-purpose logic IC, the power consumption can be reduced and the power generated by the exciter coil 3 can be used efficiently as the spark plug ignition power.

As many apparently widely different embodiments of the present invention can be made without departing from the spirit and scope thereof, it is to be understood that the invention is not limited to the specific embodiments thereof except as defined in the appended claims.

What is claimed is:

1. An ignition timing control system for an internal combustion engine, comprising:

a pulse generating circuit for generating first and second pulse signals corresponding to respective predetermined crank angles of the internal combustion engine;

a rectangular wave generating circuit which receives the first and second pulse signals from said pulse generating circuit for generating a rectangular wave signal which rises at a predetermined slope from an instant of generation of the first pulse signal, and which decays at slope less than said predetermined slope from an instant of generation of the second pulse signal;

a decision circuit which receives the rectangular wave signal from said rectangular wave generating circuit for producing an output of logic level "0" when a signal level of the rectangular wave signal is higher than a predetermined level, and an output of logic level "1" when said signal level is lower than said predetermined level;

a triangular wave generating circuit connected to said decision circuit for generating a triangular signal which rises at a constant and gentle slope from an instant said decision circuit produces the output of logic level "1", decays at a slope defining a predetermined angle from an instant the first pulse signal is generated, and which then decays generally vertically to a logic level of "0" at an instant the second pulse signal is generated; and an ignition signal generating circuit connected to said decision circuit and to said triangular wave generating circuit for generating an ignition signal when said decision circuit and triangular wave generating circuit both produce outputs of logic level "0".

* * * * *